(12) United States Patent
Nepomniachtchi et al.

(10) Patent No.: US 10,891,475 B2
(45) Date of Patent: Jan. 12, 2021

(54) SYSTEMS AND METHODS FOR ENROLLMENT AND IDENTITY MANAGEMENT USING MOBILE IMAGING

(71) Applicant: Mitek Systems, Inc., San Diego, CA (US)

(72) Inventors: Grigori Nepomniachtchi, San Diego, CA (US); James Debello, San Diego, CA (US); Michael Strange, Brea, CA (US); Michael E. Diamond, San Diego, CA (US)

(73) Assignee: MITEK SYSTEMS, INC., San Diego, CA (US)

( * ) Notice: Subject to any disclaimer, the term of this patent is extended or adjusted under 35 U.S.C. 154(b) by 0 days.

(21) Appl. No.: 16/282,250

(22) Filed: Feb. 21, 2019

(65) Prior Publication Data
US 2019/0188464 A1  Jun. 20, 2019

Related U.S. Application Data

(63) Continuation-in-part of application No. 15/077,801, filed on Mar. 22, 2016, which is a continuation of
(Continued)

(51) Int. Cl.
*G06F 9/00* (2006.01)
*G06K 9/20* (2006.01)
(Continued)

(52) U.S. Cl.
CPC ..... *G06K 9/00456* (2013.01); *G06K 9/00442* (2013.01); *G06K 9/00483* (2013.01);
(Continued)

(58) Field of Classification Search
CPC .... G06K 9/18; G06K 9/00442; G06K 9/6262; G06K 9/186; G06K 9/00456; G06K 2209/01; G06Q 20/042
See application file for complete search history.

(56) References Cited

U.S. PATENT DOCUMENTS 5,600,732 A    2/1997  Ott et al.
5,751,841 A    5/1998  Leong et al.
(Continued)

FOREIGN PATENT DOCUMENTS

KR    20040076131 A    8/2004
KR    20070115834 A    12/2007
(Continued)

OTHER PUBLICATIONS

PDF417, Wikipedia: the free encyclopedia, Oct. 21, 2008, https://en.wikipedia.org/w/index.php?title=PDF417&oldid=246681430 (Year: 2008).*

(Continued)

*Primary Examiner* — Vincent Rudolph
*Assistant Examiner* — Raphael Schwartz
(74) *Attorney, Agent, or Firm* — Procopio, Cory, Hargreaves & Savitch; Jonathan D. Cheng

(57) ABSTRACT

Systems and methods for automatic enrollment and identity verification based upon processing a captured image of a document are disclosed herein. Various embodiments enable, for example, a user to enroll in a particular service by taking a photograph of a particular document (e.g., his driver license) with a mobile device. One or more algorithms can then extract relevant data from the captured image. The extracted data (e.g., the person's name, gender, date of birth, height, weight, etc.) can then be used to automatically populate various fields of an enrollment application, thereby reducing the amount of information that the user has to manually input into his mobile device in order to complete the enrollment process. In some embodiments, a set of internal and/or external checks can be run against the data to ensure that the data is valid, has been read correctly, and is consistent with other data.

18 Claims, 4 Drawing Sheets

Related U.S. Application Data application No. 13/844,748, filed on Mar. 15, 2013, now Pat. No. 9,292,737, which is a continuation-in-part of application No. 12/778,943, filed on May 12, 2010, now Pat. No. 8,582,862, application No. 16/282,250, which is a continuation-in-part of application No. 14/217,192, filed on Mar. 17, 2014, now abandoned.

(60) Provisional application No. 61/802,098, filed on Mar. 15, 2013.

(51) Int. Cl.

| | |
|---|---|
| *G06K 9/18* | (2006.01) |
| *G06Q 20/04* | (2012.01) |
| *G06Q 20/40* | (2012.01) |
| *G06K 9/03* | (2006.01) |
| *G06Q 20/32* | (2012.01) |
| *G06K 9/00* | (2006.01) |

(52) U.S. Cl.
CPC ............ *G06K 9/036* (2013.01); *G06K 9/186* (2013.01); *G06K 9/2063* (2013.01); *G06Q 20/042* (2013.01); *G06Q 20/3276* (2013.01); *G06Q 20/4014* (2013.01); *G06K 2209/01* (2013.01)

(56) References Cited

U.S. PATENT DOCUMENTS

| | | | |
|---|---|---|---|
| 5,761,686 A | 6/1998 | Bloomberg | |
| 5,966,473 A | 10/1999 | Takahashi et al. | |
| 6,038,351 A | 3/2000 | Rigakos | |
| 6,038,553 A | 3/2000 | Hyde, Jr. | |
| 6,345,130 B1 | 2/2002 | Dahl | |
| 6,621,919 B2 | 9/2003 | Mennie et al. | |
| 6,735,341 B1 | 5/2004 | Horie et al. | |
| 6,807,294 B2 | 10/2004 | Yamazaki | |
| 6,947,610 B2 | 9/2005 | Sun | |
| 6,985,631 B2 | 1/2006 | Zhang | |
| 6,993,205 B1 * | 1/2006 | Lorie .................. | G06K 9/3208 382/290 |
| 7,020,320 B2 | 3/2006 | Filatov | |
| 7,245,765 B2 | 7/2007 | Myers et al. | |
| 7,283,656 B2 | 10/2007 | Blake et al. | |
| 7,331,523 B2 | 2/2008 | Meier et al. | |
| 7,376,258 B2 | 5/2008 | Klein et al. | |
| 7,377,425 B1 | 5/2008 | Ma et al. | |
| 7,426,316 B2 | 9/2008 | Vehvilinen | |
| 7,433,098 B2 | 10/2008 | Klein et al. | |
| 7,548,641 B2 | 6/2009 | Gilson et al. | |
| 7,558,418 B2 | 7/2009 | Verma et al. | |
| 7,593,595 B2 | 9/2009 | Heaney, Jr. et al. | |
| 7,606,741 B2 | 10/2009 | King et al. | |
| 7,735,721 B1 | 6/2010 | Ma et al. | |
| 7,793,835 B1 * | 9/2010 | Coggeshall ........... | G06F 21/552 235/375 |
| 7,869,098 B2 | 1/2011 | Corso et al. | |
| 7,873,200 B1 | 1/2011 | Oakes, III et al. | |
| 7,876,949 B1 | 1/2011 | Oakes, III et al. | |
| 7,949,176 B2 | 5/2011 | Nepomniachtchi | |
| 7,950,698 B2 | 5/2011 | Popadic et al. | |
| 7,953,268 B2 | 5/2011 | Nepomniachtchi | |
| 7,982,770 B1 | 5/2011 | Kahn et al. | |
| 7,978,900 B2 | 7/2011 | Nepomniachtchi et al. | |
| 7,983,468 B2 | 7/2011 | Ibikunle et al. | |
| 7,986,346 B2 | 7/2011 | Kaneda et al. | |
| 7,996,317 B1 | 8/2011 | Gurz | |
| 8,000,514 B2 | 8/2011 | Nepomniachtchi et al. | |
| 8,023,155 B2 | 9/2011 | Jiang | |
| 8,118,216 B2 | 2/2012 | Hoch et al. | |
| 8,126,252 B2 | 2/2012 | Abernethy et al. | |
| 8,180,137 B2 | 5/2012 | Faulkner et al. | |
| 8,290,237 B1 | 10/2012 | Burks et al. | |
| 8,300,917 B2 | 10/2012 | Borgia et al. | |
| 8,320,657 B1 | 11/2012 | Burks et al. | |
| 8,339,642 B2 | 12/2012 | Ono | |
| 8,358,826 B1 | 1/2013 | Medina, III et al. | |
| 8,379,914 B2 | 2/2013 | Nepomniachtchi et al. | |
| 8,532,419 B2 | 9/2013 | Coleman | |
| 8,538,124 B1 | 9/2013 | Harpel et al. | |
| 8,542,921 B1 * | 9/2013 | Medina ................. | G06Q 40/02 382/172 |
| 8,559,766 B2 | 10/2013 | Tilt et al. | |
| 8,959,033 B1 | 2/2015 | Oakes, III et al. | |
| 9,058,512 B1 | 6/2015 | Medina, III | |
| 9,842,331 B2 | 12/2017 | Nepomniachtchi et al. | |
| 2001/0014183 A1 | 8/2001 | Sansom-Wai et al. | |
| 2001/0016084 A1 | 8/2001 | Pollard et al. | |
| 2001/0019664 A1 | 9/2001 | Pilu | |
| 2002/0003896 A1 | 1/2002 | Yamazaki | |
| 2002/0012462 A1 | 1/2002 | Fujiwara | |
| 2002/0041717 A1 | 4/2002 | Murata et al. | |
| 2002/0067846 A1 | 6/2002 | Foley | |
| 2003/0072568 A1 | 4/2003 | Lin et al. | |
| 2003/0086615 A1 | 5/2003 | Dance et al. | |
| 2003/0161523 A1 | 8/2003 | Moon et al. | |
| 2003/0177100 A1 | 9/2003 | Filatov | |
| 2004/0012679 A1 | 1/2004 | Fan | |
| 2004/0037448 A1 | 2/2004 | Brundage | |
| 2004/0109597 A1 | 6/2004 | Lugg | |
| 2004/0213434 A1 | 10/2004 | Emerson et al. | |
| 2004/0218799 A1 | 11/2004 | Mastie et al. | |
| 2005/0011957 A1 | 1/2005 | Attia et al. | |
| 2005/0065893 A1 | 3/2005 | Josephson | |
| 2005/0097046 A1 | 5/2005 | Singfield | |
| 2005/0100216 A1 | 5/2005 | Myers et al. | |
| 2005/0143136 A1 | 6/2005 | Lev et al. | |
| 2005/0196071 A1 | 9/2005 | Prakash et al. | |
| 2005/0213805 A1 | 9/2005 | Blake et al. | |
| 2005/0219367 A1 | 10/2005 | Kanda et al. | |
| 2005/0220324 A1 | 10/2005 | Klein et al. | |
| 2005/0242186 A1 | 11/2005 | Ohbuchi | |
| 2005/0261990 A1 | 11/2005 | Gocht et al. | |
| 2006/0008167 A1 | 1/2006 | Yu et al. | |
| 2006/0008267 A1 | 1/2006 | Kim | |
| 2006/0012699 A1 | 1/2006 | Miki | |
| 2006/0045379 A1 | 3/2006 | Heaney et al. | |
| 2006/0071950 A1 | 4/2006 | Kurzweil et al. | |
| 2006/0072822 A1 | 4/2006 | Hatzav et al. | |
| 2006/0140504 A1 | 6/2006 | Fujimoto et al. | |
| 2006/0164682 A1 | 7/2006 | Lev | |
| 2006/0177118 A1 | 8/2006 | Ibikunle et al. | |
| 2006/0182331 A1 * | 8/2006 | Gilson .................. | G06Q 20/04 382/137 |
| 2006/0210192 A1 | 9/2006 | Orhun | |
| 2006/0221415 A1 | 10/2006 | Kawamoto | |
| 2006/0280354 A1 | 12/2006 | Murray | |
| 2006/0291727 A1 | 12/2006 | Bargeron | |
| 2007/0053574 A1 | 3/2007 | Verma et al. | |
| 2007/0058851 A1 | 3/2007 | Quine et al. | |
| 2007/0076940 A1 | 4/2007 | Goodall et al. | |
| 2007/0081796 A1 | 4/2007 | Fredlund et al. | |
| 2007/0084911 A1 | 4/2007 | Crowell | |
| 2007/0086643 A1 | 4/2007 | Spier et al. | |
| 2007/0140678 A1 | 6/2007 | Yost et al. | |
| 2007/0154071 A1 | 7/2007 | Lin et al. | |
| 2007/0156438 A1 | 7/2007 | Popadic et al. | |
| 2007/0168382 A1 | 7/2007 | Tillberg et al. | |
| 2007/0171288 A1 | 7/2007 | Inoue et al. | |
| 2007/0195174 A1 | 8/2007 | Oren | |
| 2007/0206877 A1 | 9/2007 | Wu | |
| 2007/0211964 A1 | 9/2007 | Agam et al. | |
| 2007/0288382 A1 | 12/2007 | Narayanan et al. | |
| 2008/0031543 A1 | 2/2008 | Nakajima et al. | |
| 2008/0040259 A1 * | 2/2008 | Snow ..................... | G06Q 40/02 705/38 |
| 2008/0062437 A1 | 3/2008 | Rizzo | |
| 2008/0089573 A1 | 4/2008 | Mod et al. | |
| 2008/0174815 A1 | 7/2008 | Komaki | |
| 2008/0183576 A1 | 7/2008 | Kim et al. | |
| 2008/0192129 A1 | 8/2008 | Walker et al. | |

(56) References Cited

U.S. PATENT DOCUMENTS

| | | |
|---|---|---|
| 2008/0212901 A1* | 9/2008 | Castiglia ............ G06K 9/033 |
| | | 382/311 |
| 2008/0231714 A1 | 9/2008 | Estevez et al. |
| 2008/0247629 A1 | 10/2008 | Gilder et al. |
| 2008/0267510 A1 | 10/2008 | Paul et al. |
| 2009/0063431 A1 | 3/2009 | Erol et al. |
| 2009/0092322 A1 | 4/2009 | Erol et al. |
| 2009/0125510 A1* | 5/2009 | Graham ............ G06Q 30/02 |
| 2009/0141962 A1 | 6/2009 | Borgia et al. |
| 2009/0185241 A1 | 7/2009 | Nepomniachtchi |
| 2009/0185736 A1 | 7/2009 | Nepomniachtchi |
| 2009/0185737 A1 | 7/2009 | Nepomniachtchi |
| 2009/0185738 A1 | 7/2009 | Nepomniachtchi |
| 2009/0261158 A1 | 10/2009 | Lawson |
| 2010/0073735 A1 | 3/2010 | Hunt et al. |
| 2010/0074547 A1 | 3/2010 | Yu et al. |
| 2010/0080471 A1 | 4/2010 | Haas et al. |
| 2010/0102119 A1 | 4/2010 | Gustin et al. |
| 2010/0104171 A1 | 4/2010 | Faulkner et al. |
| 2010/0114765 A1 | 5/2010 | Gustin et al. |
| 2010/0114766 A1 | 5/2010 | Gustin et al. |
| 2010/0114771 A1 | 5/2010 | Gustin et al. |
| 2010/0114772 A1 | 5/2010 | Gustin et al. |
| 2010/0200660 A1 | 8/2010 | Moed et al. |
| 2010/0208282 A1 | 8/2010 | Isaev |
| 2011/0013822 A1 | 1/2011 | Meek et al. |
| 2011/0081051 A1 | 4/2011 | Tayal et al. |
| 2011/0091092 A1 | 4/2011 | Nepomniachtchi et al. |
| 2011/0280450 A1 | 11/2011 | Nepomniachtchi et al. |
| 2012/0030104 A1 | 2/2012 | Huff et al. |
| 2012/0070062 A1 | 3/2012 | Houle et al. |
| 2012/0230577 A1 | 9/2012 | Calman et al. |
| 2014/0040141 A1 | 2/2014 | Gauvin et al. |

FOREIGN PATENT DOCUMENTS

| | | |
|---|---|---|
| WO | 2006075967 A1 | 7/2006 |
| WO | 2006136958 A2 | 12/2006 |

OTHER PUBLICATIONS

International Search Report issued in related International Application No. PCT/US2011/056593 dated May 30, 2012 (3 pages).

Office Action dated Jan. 9, 2020 for related U.S. Appl. No. 16/397,728 in 56 pages.

Notice of Allowance for related U.S. Appl. No. 16/742,439, dated Sep. 18, 2020, in 39 pages.

\* cited by examiner

SYSTEMS AND METHODS FOR ENROLLMENT AND IDENTITY MANAGEMENT USING MOBILE IMAGING

RELATED APPLICATION INFORMATION

This application claims priority under 35 U.S.C. § 120 as a continuation in part to U.S. patent application Ser. No. 15/077,801, filed Mar. 22, 2016, and entitled "SYSTEMS AND METHODS FOR CLASSIFYING PAYMENT DOCUMENTS DURING MOBILE IMAGE PROCESSING," which in turn claims priority as a continuation to U.S. patent application Ser. No. 13/844,748, filed Mar. 15, 2013, and entitled "SYSTEMS AND METHODS FOR CLASSIFYING PAYMENT DOCUMENTS DURING MOBILE IMAGE PROCESSING," now U.S. Pat. No. 9,292,737, issued on Mar. 22, 2016, which in turn claims priority as a continuation in part to U.S. patent application Ser. No. 12/778,943, filed May 12, 2010, and entitled "MOBILE IMAGE QUALITY ASSURANCE IN MOBILE DOCUMENT IMAGE PROCESSING APPLICATIONS," now U.S. Pat. No. 8,582,862, issued on Nov. 12, 2013; and as a continuation in part to U.S. patent application Ser. No. 14/217,192, filed Mar. 17, 2014, and entitled "SYSTEMS AND METHODS FOR ENROLLMENT AND IDENTITY MANAGEMENT USING MOBILE IMAGING," which in turn claims priority under 35 U.S.C. § 119(e) to U.S. Provisional Patent Application No. 61/802,098, filed Mar. 15, 2013, and entitled "SYSTEMS AND METHODS FOR ENROLLMENT AND IDENTITY MANAGEMENT USING MOBILE IMAGING," each of which is incorporated herein by reference in their entirety.

BACKGROUND

1. Field of the Invention

Various embodiments described herein relate generally to the field of identity verification through image processing. More particularly, various embodiments are directed in one exemplary aspect to support automatic enrollment and identity verification upon processing a captured image of a document.

2. Related Art

Mobile phone adoption continues to escalate, including ever-growing smart phone adoption and tablet usage. Mobile imaging is a discipline where a consumer takes a picture of a document, and that document is processed, extracting and extending the data contained within it for selected purposes. The convenience of this technique is powerful and is currently driving a desire for this technology throughout Financial Services and other industries.

At the same time, consumers are looking for quicker and easier ways to enroll in new products and services. During a typical enrollment process, consumers must identify themselves, providing common personal and demographic data. However, since mobile devices are increasingly becoming the desired device for such purposes, typing such data into a mobile device can be cumbersome. Additionally, the institution providing the desired service must verify and validate the identity of the customer in order to manage their business risk. Presently, there is no means or mechanism for providing automatic enrollment and identity verification through mobile imaging.

SUMMARY

Disclosed herein are systems and methods for automatic enrollment and identity verification based on processing of a captured image of a document. Various embodiments enable, for example, a user to enroll in a particular service by taking a photograph of a particular document (e.g., a driver license) with a mobile device. One or more processes can then extract relevant identifying data from the captured image. The extracted identifying data (e.g., the person's name, gender, date of birth, height, weight, etc.) can then be used to automatically populate various fields of an enrollment application, thereby reducing the amount of information that the user has to manually input into the mobile device in order to complete an enrollment process. In some embodiments, a set of internal and/or external checks can be run against the data to ensure that the data is valid, has been read correctly, and is consistent with other data.

In a first exemplary aspect, a computer readable medium is disclosed. In one embodiment, the computer readable medium contains instructions which, when executed by a computer, perform a process comprising: receiving an image of a document; preprocessing the image of the document in preparation for data extraction; extracting a set of identifying data from the image of the document; and automatically populating fields of an enrollment form based at least in part upon the extracted set of identifying data.

Other features and advantages should become apparent from the following description of the preferred embodiments, taken in conjunction with the accompanying drawings.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding and shall not be considered limiting of the breadth, scope, or applicability of the embodiments. It should be noted that for clarity and ease of illustration these drawings are not necessarily made to scale.

DETAILED DESCRIPTION

Figure 1:
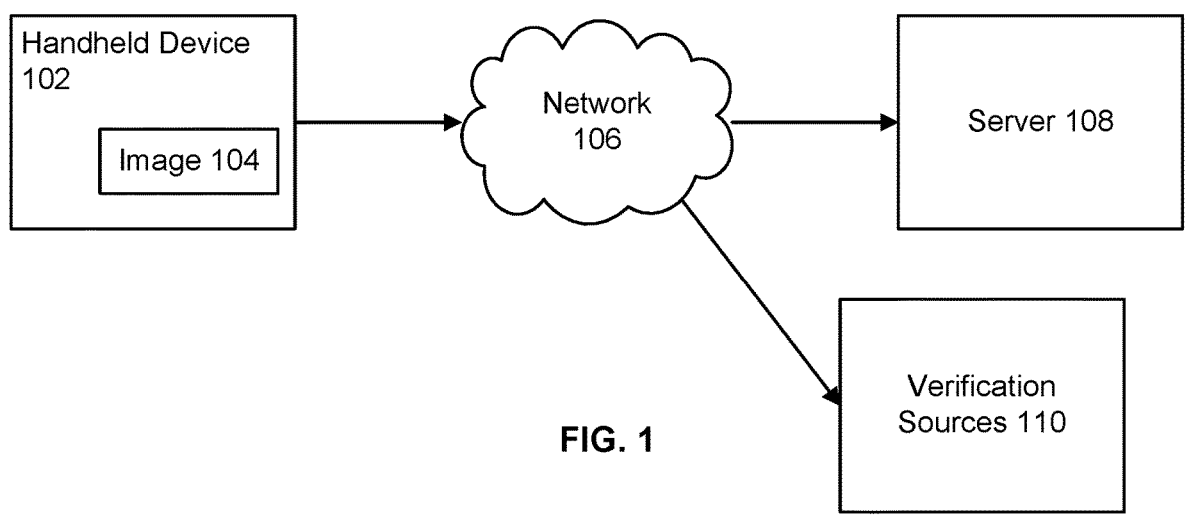
FIG. 1 is a block diagram illustrating an exemplary network topology that may be used for automatic enrollment and identity management according to embodiments.

FIG. 1 is a block diagram illustrating an exemplary network topology that may be used for automatic enrollment and identity management according to embodiments. As shown by this figure, the network topology can comprise a mobile device 102, such as a cellular phone, smartphone, tablet, laptop, wearable device, etc. that is interfaced with a server 108 over a connected network 106. The mobile device 102 may be configured with an image capture device to capture one or more images 104 which are then used in the enrollment and identity verification process described below. One or more verification sources 110 may also be connected with the network 106 in order to communicate verification data to verify the extracted identifying data from the image, as will be described further herein. The following processing steps to process the image and extract the identifying data may be carried out on one or both of the mobile device and server 108.

Figure 2:
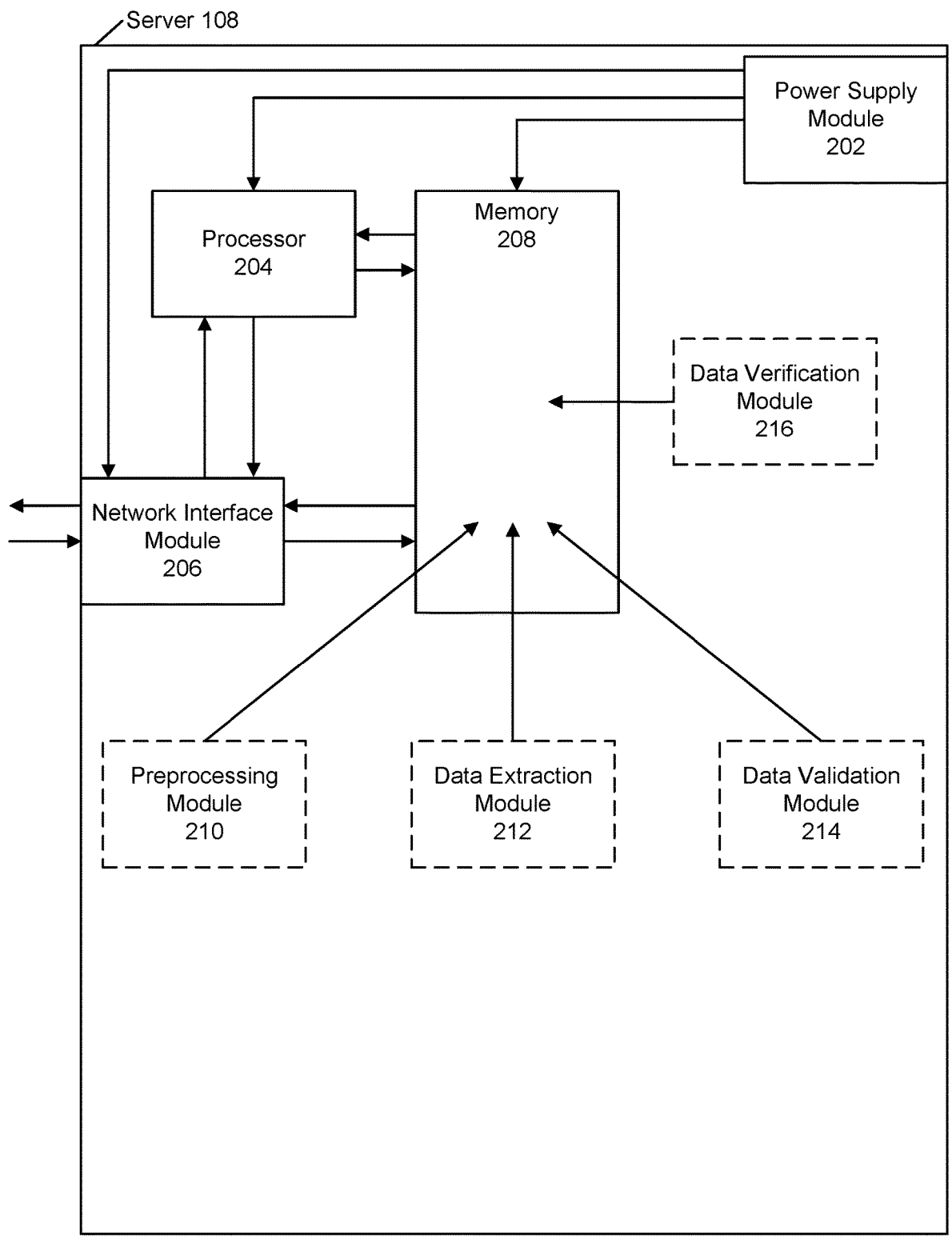
FIG. 2 is a block diagram illustrating an exemplary server adapted to perform automatic enrollment and identity management according to embodiments.

FIG. 2 is a block diagram illustrating an exemplary server 108 adapted to perform automatic enrollment and identity management according to embodiments. As shown by this figure, server 108 may include a power supply module 202, a network interface module 206, one or more processors 204, and memory 208. Various modules such as a preprocessing module 210, data extraction module 212, data validation module 214, and data verification module 216 can be resident within memory.

Figure 3:
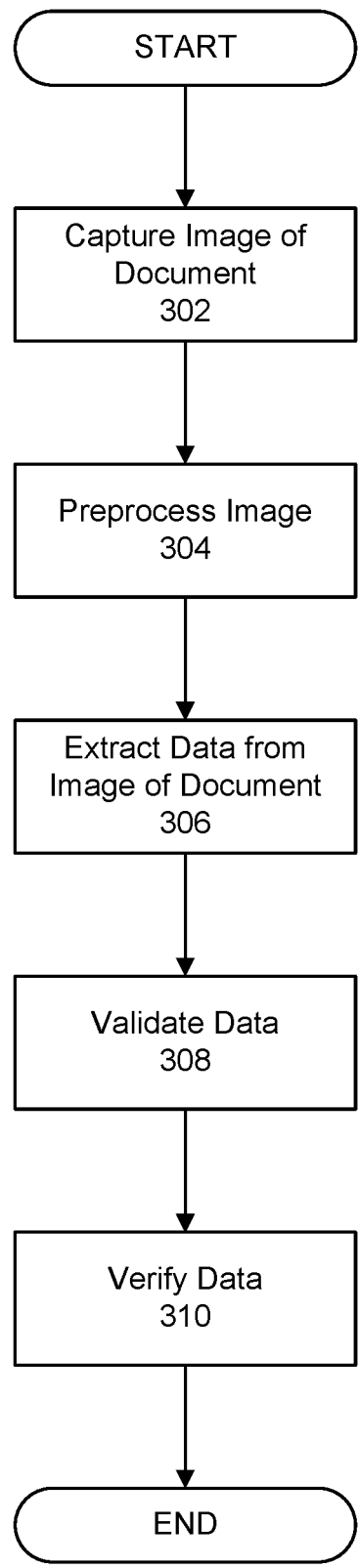
FIG. 3 is a flow diagram illustrating an exemplary method of performing automatic enrollment and identity management according to embodiments.

FIG. 3 is a flow diagram illustrating an exemplary method of performing automatic enrollment and identity management according to embodiments. As depicted in this figure, the exemplary method can comprise five steps according to various embodiments. First, in step 302, an image of an identity document can be captured on a mobile device. Second, in step 304, the image can be preprocessed in order to prepare the image for data extraction. Third, in step 306, key identity-related data can be obtained from the image of the identity document. Fourth, in step 308, the extracted data can be validated in order to assess the quality of the data. Fifth, in step 310, the extracted data can be verified to assess identity risk using independent external data sources. Each of these steps is now discussed in further detail below.

In one embodiment, the results from the validating and verifying steps are organized into a Mobile Identity Risk Scorecard. This scorecard is a structured information model for presenting the risks associated with a proposed identity to Financial Services or other organizations. The exact contents of the scorecard can vary according to the intended use, but will generally include numeric indicators (0 to 1000), graphical indicators (red-yellow-green) or other patterned indicators which denote aspects of identity risk.

Document Capture

At block 302, an image of a document is captured. According to some embodiments, an application or browser session initiates the capture sequence on a mobile device or tablet. This can be implemented in the form of a library, embedded in a downloaded mobile application, a hybrid application invoked from within a mobile browser, or an automatic capture utility embedded in a mobile application. The capture sequence can guide the user through obtaining a mobile imaging-ready picture of the document. In some embodiments, one or more characteristics can be optimized before image capture, including, without limitation—focus, corner detection, lighting conditions, reflective properties, and closeness. Also, in some embodiments, feedback can provided to the user through an interactive set of visual cues, informing the user, for example, of how "well they are doing."

In one form of the above, the consumer takes a picture of the front of their Driver's License. In another form, the MRZ line on a passport is read. In a third form, a full identity document is read, such as a government-issued ID or military ID.

Optionally, the user can also provide one or more "hints"—information which can be used to more accurately determine information on the document. For example, the user might provide their last name, which could be used to more accurately determine the location of the name and address on the document.

In some embodiments, the capture process can also read a barcode present on the identity document and extract key information relating to identity. This information can be used to cross-validate the information obtained during the Data Extraction process.

Pre-Processing

At block 304, the mobile image, once captured on the mobile device, can be preprocessed. Preprocessing can include a number of operations, including cropping, deskewing, and/or dewarping the image. Additionally, shadows can be eliminated, lighting issues can be enhanced, and the overall readability of the document image can be improved through one or more mathematical algorithms. The image can also be converted to a bitonal image in preparation for data extraction. Depending on the specific needs of the document type, multiple versions of the binarized image may be needed to handle document-specific readability issues, such as reverse text. In these cases, the preprocessing engine can create multiple bitonal images which can be used in combination during the data extraction process. In addition, a series of image quality and assurance (IQA) test scores can be calculated, indicating the quality of the original image.

Data Extraction

At block 306, relevant data can be extracted from the image of the document. A set of fields known to be available can be determined based on the document type. For example, in an Illinois Driver License, the fields known to be available can include a person's name, address, date of birth, height, weight, document expiration date, and other data.

In some embodiments, individual field confidence scores can also be calculated. For example, in one embodiment, confidence scores can be defined in a range from 0 to 1000, with 1000 representing high technical confidence in the readability of that field, and 0 representing low technical confidence. The confidence scores are calculated using a mathematical formula based on the ability to identify the characters included in each field, including such factors as sharpness. These statistical measures can be used when presenting the data to the user (for example, a low-confidence field can be highlighted, requesting that the user to confirm the data that has been extracted).

The confidence scores would be used by the application leveraging a Mobile Photo Account Opening and Identity Management solution, including applying thresholds to the confidence scores, highlighting those fields with a confidence score below a fixed value (example: highlight fields below 500). If a PDF417 barcode was scanned, the deconstructed string is parsed, identifying each of the relevant fields. A rules engine is applied, to handle a variety of exceptions in the content of the string, including missing fields, concatenated fields, abbreviated fields, and other state-level and local-level deviations. To date, more than 200 variations have been identified, so the use of a rules engine to organize the parsing of the string is a key component of the overall solution Data Validation At block 308, the extracted data can be validated using a variety of data validation techniques. As used herein, the term "validation" refers to the evaluation of data using rules and internally-consistent controls available within the mobile imaging process. These techniques can include, without limitation: validation that the information scanned from the PDF417 barcode matches the data obtained during data extraction, if available; validation that the information scanned using the barcode matches the data obtained during data extraction, if available; comparison of date fields to verify date format (This may be used to improve the data (for example, it is not possible to have a 13$^{th}$ month) or to validate the document (for example, exceptions would be flagged, such as expiration dates in the past, birthdates less than 16 years ago, birthdates over 100 years ago, etc.); validation that the expiration date is greater than today; validation that the date of birth is some date earlier than today; validation of data fields to known masks (example: zip code—(either XXXXX or XXXXX-XXXX) in the United States. Exceptions may be able to be corrected, by using a USPS database, or flagged as low-confidence); and validation of data fields to known minimum and maximum field lengths (ex. Validation of state field to defined set of 2-character abbreviations. Exceptions may be able to be corrected, by using a USPS database, or flagged as low-confidence). A myriad of other techniques for validation are possible in accordance with the scope of various embodiments.

Data Verification

At block 310, the extracted data can then be verified using a variety of data verification techniques. As used herein, the term "verification" refers to the evaluation of data using external data sources (110 in FIG. 1) or external verification logic. These techniques may include, without limitation: establishing that a person exists with the extracted name; determining if a unique individual can be determined given the extracted data; determining if a social security number can be identified with the given data; attempting to match an address to a United States Postal Service (USPS) database of known addresses; verifying that the individual has lived at the extracted address; verifying that the name matches the name associated with the extracted driver license number; verifying that the name matches a name associated with an extracted social security number. A myriad of other techniques for verification are possible in accordance with the scope of various embodiments.

Applications

In one embodiment, a Mobile Photo Account Opening and Identity Management solution may allow a consumer to fund the account once the information from the identity document is used to create a new account. To do this, the consumer would do one of the following: take a picture of a completed check, depositing it in the new account; take a picture of a blank check, to collect the routing and account number from the MICR line, to facilitate an ACH transfer; automatically scan a credit card, using an automatic capture utility, by holding the card in front of the camera of the mobile device, automatically detecting the 15-digit or 16-digit account number on the face of the card. This information is used by the calling application to pre-fill the information needed to complete a credit card funding transaction.

Multiple embodiments of potential applications are now provided herein.

In one embodiment, a system of automatically scanning a credit card, using an automatic capture utility, by holding the card in front of the camera of the mobile device, automatically detecting the 15-digit or 16-digit account number on the face of the card.

A system of Mobile Photo Account Opening and Identity Management, including the following: US Driver's License Capture (front of document), US Driver's License PDF417 scan (on back of document), Preprocessing of image, Data extraction from image, Deconstruction of PDF417 contents using a rules engine, Validation, including comparison of PDF417 contents to extracted data and Funding A system of Mobile Photo Account Opening and Identity Management, including the following: US Driver's License Capture (front of document), Preprocessing of image, Data extraction from image, Validation, Funding, A system of Mobile Photo Account Opening and Identity Management, including the following: US Driver's License Capture (front of document), US Driver's License PDF417 scan (on back of document), Preprocessing of image, Data extraction from image, Deconstruction of PDF417 contents using a rules engine, Validation, including comparison of PDF417 contents to extracted data.

A system of Mobile Photo Account Opening and Identity Management, including the following: US Driver's License Capture (front of document), Preprocessing of image, Data extraction from image, Validation.

A system of Mobile Photo Account Opening and Identity Management, including the following: Passport Capture (MRZ contents), Preprocessing of image, Data extraction from MRZ, Validation, Funding.

A system of Mobile Photo Account Opening and Identity Management, including the following: Passport Capture (MRZ contents), Preprocessing of image, Data extraction from MRZ, Validation.

A system of Mobile Photo Account Opening and Identity Management, including the following: Government or other identity document capture, Preprocessing of image, Data extraction, Validation, Funding.

A system of Mobile Photo Account Opening and Identity Management, including the following: Government or other identity document capture, Preprocessing of image, Data extraction, Validation.

Computer-Enabled Embodiment

For the purposes of the embodiments described herein, the term "computer" as used throughout this disclosure may be implemented as any computing device, including a mobile phone or a tablet.

Figure 4:
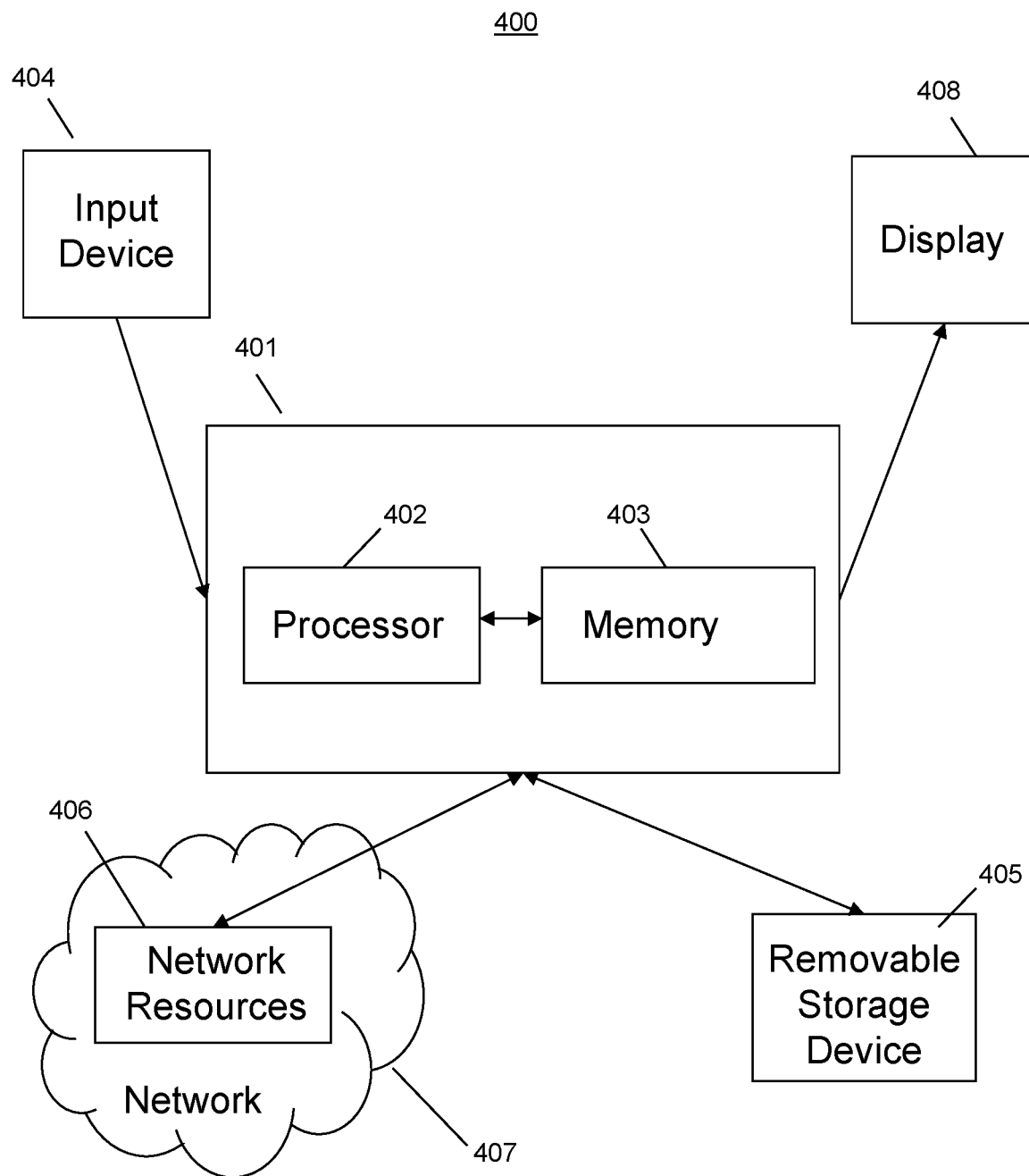
FIG. 4 is a block diagram that illustrates an embodiment of a computer/server system upon which an embodiment of the inventive methodology may be implemented The various embodiments mentioned above are described in further detail with reference to the aforementioned figured and the following detailed description of exemplary embodiments.

FIG. 4 is a block diagram that illustrates an embodiment of a computer/server system 400 upon which an embodiment of the inventive methodology may be implemented. The system 400 includes a computer/server platform 401 including a processor 402 and memory 403 which operate to execute instructions, as known to one of skill in the art. The term "computer-readable storage medium" as used herein refers to any tangible medium, such as a disk or semiconductor memory, that participates in providing instructions to processor 402 for execution. Additionally, the computer platform 401 receives input from a plurality of input devices 404, such as a keyboard, mouse, touch device or verbal command. The computer platform 401 may additionally be connected to a removable storage device 405, such as a portable hard drive, optical media (CD or DVD), disk media or any other tangible medium from which a computer can read executable code. The computer platform may further be connected to network resources 406 which connect to the Internet or other components of a local public or private network. The network resources 406 may provide instructions and data to the computer platform from a remote location on a network 407. The connections to the network resources 406 may be via wireless protocols, such as the 802.11 standards, Bluetooth® or cellular protocols, or via physical transmission media, such as cables or fiber optics. The network resources may include storage devices for storing data and executable instructions at a location separate from the computer platform 401. The computer interacts with a display 408 to output data and other information to a user, as well as to request additional instructions and input from the user. The display 408 may therefore further act as an input device 404 for interacting with a user.

While various embodiments have been described above, it should be understood that they have been presented by way of example only, and not of limitation. The breadth and scope should not be limited by any of the above-described exemplary embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method for providing automatic enrollment through mobile imaging, comprising:
   receiving an image of a document captured by a camera;
   preprocessing, by one or more processors, the image of the document based on a series of image quality and assurance (IQA) tests;
   prior to extracting a set of identity data from the image of the document, receiving manually entered identity data associated with an individual, and determining a location of the set of identity data within the image of the document based on the manually entered identity data;
   extracting the set of identity data associated with the individual from the image of the document using results of the IQA tests, wherein extracting the set of identity data comprises
      calculating a confidence score for each of a plurality of fields, and
      individually highlighting each of the plurality of fields for which the calculated confidence score is below a fixed value;
   validating, by the one or more processors, the extracted set of identity data to assess a quality of the extracted identity data, wherein validating the extracted set of identity data comprises
      reading a barcode present in the document, and
      determining whether or not information in the barcode matches the extracted set of identity data;
   verifying the extracted set of identity data to assess an identity risk of the individual to a financial services organization, wherein the identity risk is a risk that the extracted set of identity data of the individual may be unreliable, wherein the extracted set of identity data includes an extracted name and a second form of identity information uniquely associated with a name, and wherein verifying the extracted set of identity data to assess the identity risk comprises
      verifying that a person by the extracted name exists, and
      verifying that the extracted name matches the second form of identity information;
   automatically populating fields of an enrollment form for a transaction based at least in part upon the extracted set of identity data; and
   organizing results of the validation and verification into a mobile identity risk scorecard, wherein the mobile identity risk scorecard comprises a structured information model that indicates risks associated with the set of identity data and comprises one or more indicators which denote aspects of identity risk.

2. The method of claim 1, wherein the barcode comprises a PDF417 barcode.

3. The method of claim 1, wherein the one or more indicators comprise one or more numeric indicators which denote identity risk.

4. The method of claim 1, wherein the one or more indicators comprise one or more graphical indicators which denote identity risk.

5. The method of claim 1, wherein the method is implemented as a software library.

6. The method of claim 5, wherein the software library is embedded in a mobile application.

7. The method of claim 1, wherein the document is a government-issued identity document.

8. The method of claim 7, wherein the government-issued identity document is a driver's license.

9. The method of claim 7, wherein the government-issued identity document is a passport.

10. The method of claim 7, wherein the government-issued identity document is a military identification card.

11. The method of claim 1, wherein preprocessing comprises cropping the image of the document.

12. The method of claim 1, wherein preprocessing comprises de-skewing the image of the document.

13. The method of claim 1, wherein preprocessing comprises de-warping the image of the document.

14. The method of claim 1, wherein preprocessing comprises converting text in the image of the document into reverse text.

15. The method of claim 1, wherein preprocessing comprises creating one or more bi-tonal images from the image of the document.

16. The method of claim 1, wherein highlighting a field comprises requesting a user to confirm data in the field.

17. The method of claim 1, wherein extracting the set of identity data comprises applying a rules engine to handle exceptions in fields of the identity data.

18. The method of claim 1, further comprising:
   creating a new financial account based on the enrollment form and
   funding the new financial account by
      capturing an image of a check or credit card,
      extracting at least an account number from the image of the check or credit card, and initiating a transfer of funds to the new financial account from an existing financial account associated with the extracted account number.

\* \* \* \* \*